(12) United States Patent
Haran et al.

(10) Patent No.: US 8,000,602 B2
(45) Date of Patent: Aug. 16, 2011

(54) METHODS AND DEVICES FOR REDUCING POWER CONSUMPTION IN A PASSIVE OPTICAL NETWORK WHILE MAINTAINING SERVICE CONTINUITY

(75) Inventors: Onn Haran, Even Yehuda (IL); Lior Khermosh, Givataim (IL); Victor Vaisleib, Ramat Gan (IL)

(73) Assignee: PMC-Sierra Israel Ltd., Herzliya (IL)

( * ) Notice: Subject to any disclaimer, the term of this patent is extended or adjusted under 35 U.S.C. 154(b) by 663 days.

(21) Appl. No.: 12/104,615

(22) Filed: Apr. 17, 2008

(65) Prior Publication Data

US 2009/0263127 A1 Oct. 22, 2009

(51) Int. Cl.
*H04B 10/00* (2006.01)
(52) U.S. Cl. .............................. 398/72; 398/67; 398/70
(58) Field of Classification Search ............... 398/66–72
See application file for complete search history.

(56) References Cited

U.S. PATENT DOCUMENTS

| | | | | |
|---|---|---|---|---|
| 5,504,606 A * | 4/1996 | Frigo | | 398/58 |
| 6,778,550 B1 * | 8/2004 | Blahut | | 370/443 |
| 7,287,175 B2 * | 10/2007 | Vereen et al. | | 713/323 |
| 7,389,528 B1 * | 6/2008 | Beser | | 725/111 |
| 7,545,813 B2 * | 6/2009 | Davis et al. | | 370/395.4 |
| 7,751,711 B2 * | 7/2010 | Wynman | | 398/72 |
| 2006/0029389 A1 * | 2/2006 | Cleary et al. | | 398/33 |
| 2006/0053309 A1 | 3/2006 | Vereen et al. | | |
| 2006/0093356 A1 * | 5/2006 | Vereen et al. | | 398/33 |
| 2008/0195881 A1 * | 8/2008 | Bernard et al. | | 713/340 |
| 2009/0263127 A1 * | 10/2009 | Haran et al. | | 398/38 |

* cited by examiner

*Primary Examiner* — Agustin Bello
(74) *Attorney, Agent, or Firm* — Mark M. Friedman

(57) ABSTRACT

The present invention discloses methods for reducing power consumption in a PON while maintaining service continuity, the method including the steps of: providing an OLT operationally connected to at least one ONU; triggering a sleep request for at least one requesting ONU; upon receiving a sleep acknowledgement, activating a sleep mode for at least one requesting ONU according to a sleep period designated in the sleep request; and terminating the sleep mode according to the sleep period. Preferably, the sleep acknowledgement is transmitted from the OLT to the requesting ONU. Preferably, the sleep period is executed by a sleep command in the sleep acknowledgement. Preferably, the method further includes the step of: upon completion of the sleep period, transmitting buffered data traffic from the OLT to a sleeping ONU. Preferably, the step of transmitting is performed without the sleeping ONU being re-registered and without causing packet reordering.

26 Claims, 4 Drawing Sheets

METHODS AND DEVICES FOR REDUCING POWER CONSUMPTION IN A PASSIVE OPTICAL NETWORK WHILE MAINTAINING SERVICE CONTINUITY

FIELD AND BACKGROUND OF THE INVENTION

The present invention relates to methods and devices for reducing power consumption in a passive optical network (PON) while maintaining service continuity.

Fiber access networks (e.g. Ethernet PON-EPON and gigabit PON-GPON) provide continuous operation for allowing ultra-high-speed communication. During network operation, the optics are always powered on, the media access control (MAC) unit is clocked, and the MAC logic is being toggled. The power consumption varies only slightly with respect to the actual consumed bandwidth.

Reducing power consumption is fiber access networks is a growing concern due to fiber installations that use batteries for powering optical-network units (ONUs) during a power outage. Reducing the power consumption enables both a smaller and less-costly battery and a longer "battery-backup" time. Furthermore, due to concerns over global warming, improving the power consumption of electronic devices is considered to be a global demand.

In order to reduce power consumption effectively, two requirements need to be met. The first requirement is to reduce power consumption in the fiber access network by reducing activity and responsiveness. The second requirement is to maintain service availability.

In the prior art, there are known schemes for low-power operation of ONUs and optical-line terminals (OLTs). US Patent Publication No. 20060053309, incorporated by reference as if fully set forth herein, teaches an ONU with low-power sleep logic that substantially extends the life of the battery after the AC main power supply has been lost. US Patent Publication No. 20060029389, incorporated by reference as if fully set forth herein, teaches an ONU with low-power hibernation. In both prior-art references, the ONU is powered off with only a "watchdog" circuit is remaining active. Such prior-art methods cannot guarantee service continuity.

It would be desirable to have methods and devices for reducing power consumption in a PON while maintaining service continuity.

SUMMARY OF THE INVENTION

It is the purpose of the present invention to provide methods and devices for reducing power consumption in a PON while maintaining service continuity.

In preferred embodiments of the present invention, PON power consumption is reduced to close to the relative amount of used bandwidth (both for ONUs and optical line terminals, OLTs). Power consumption is reduced by minimizing the activity of the optical components and digital processing. ONUs are scheduled to enter a "sleep" mode for a pre-defined period of time. Upon "wake-up", the ONUs check whether they should return to sleep mode or remain active. According to methods of the present invention, ONUs are able to recovering from a power shut-down without re-registering to the network or suffering any packet loss. Data that arrives while an ONU (or OLT) is in sleep mode is stored in a buffer memory. In other preferred embodiments of the present invention, methods allow low-power ONUs to be connected to legacy OLTs, providing backward compatibility with lower performance due to data loss.

Sleep-mode operation is configured to minimize resource utilization for ONUs and OLTs. Typical OLT implementations use a shared queuing system for all ONUs, rather than a dedicated queue per ONU. Such a scheme is possible only if all ONUs in sleep mode are scheduled for the same sleep cycles (i.e. start and duration). In order to minimize power consumption, the active time of ONUs is configured to be minimized. Such a protocol implies that a control algorithm needs to minimize the number of transactions between an OLT and ONUs.

The resiliency of the protocol is important. An ONU cannot "disappear" from the OLT. An ONU will not enter sleep mode without explicit permission from the OLT. In the event that sleep-mode operation is not coordinated between an ONU and an OLT, besides there being a reduction in power savings, network behavior due to lost packets should be considered so that a disaster is not created. As mentioned above, some embodiments compromise operation by allowing packet loss in order to provide power savings to networks connected to legacy OLTs. In order to avoid such lack of coordination between an ONU and an OLT, each command message is transmitted three times to increase reception probability.

Sleep mode is activated only when no service is active. Service can begin just after an ONU enters sleep mode, exhibiting an increased service-handling latency limited by the sleep period. However, the received data is stored for later transmission with no packets being lost.

Communication protocols based on the Open Systems Interconnection basic reference model (OSI model) are configured specifically for networking applications and network communication. The OSI model utilizes a multi-level scheme to provide a flexible solution that accommodates all such variation with a standard interface. Because each protocol module usually communicates with two other modules, the modules are commonly referred to as "layers" in a stack of protocols. In the OSI model, there are seven layers. The layers are: physical (L1), data link (L2), network (L3), transport (L4), session (L5), presentation (L6), and application (L7).

A layer is a collection of related functions that provides services to the layer above it and receives service from the layer below it. The lowest layer (known as the physical layer) always deals with low-level, physical interaction of the hardware. Every higher layer adds more features. User applications usually deal only with the top-most layers (e.g. L6 and L7). For purposes of the present invention, the PHY layer is referred to as L1, and the MAC layer is referred to as L2 herein.

A sleeping device has no active receive circuitries (i.e. L1 and L2 are temporarily inactive). The MAC layer includes mechanisms to bridge the temporary inactivity by adding buffering at the MAC layer. Consequently, upper layers (i.e. L3 and above) are unaware of the lower-layer temporary inactivity. Each device, which is sleeping or "feeding" a sleeping device, contains buffers. In "lossless" mode, a device receiving data for a sleeping device stores all traffic in a dedicated sleep buffer, and transmits the data from the buffer only after the sleep period has ended. When data losses are allowed, no buffering is performed.

As mentioned above, a precondition for such a resource-utilization scheme is full availability of lower layers at the end of a sleep period. In order to accomplish this, L1 needs to determine the necessary level of gain, clock frequency, and phase, and the MAC layer needs to resynchronize the line framing. Once full synchronization is regained, the device resumes operation as if it was never in sleep mode. All configuration parameters remain intact, and the device remains operational.

For GPON, the state is called "operation" state (O5). For EPON, the state is called "registered" state. In such an approach, service continuity is maintained from the upper-layer perspective. Upon wake-up, a PON device is not required to "re-range". Changes detected in round-trip delay (RTD) are sent by the OLT after an ONU ends its sleep period. The expected changes in round-trip time (RTT) are small enough to allow correct uplink operation after a sleep period has ended. Performance meters are paused during sleep periods. The performance meters maintain continuity by halting counting during sleep periods, and resuming operation only after synchronization is regained.

Therefore, according to the present invention, there is provided for the first time an optical-network unit (ONU) for reducing power consumption in a passive optical network (PON) while maintaining service continuity, the optical-network unit including: (a) a sleep-message generator for generating a sleep message; (b) a sleep-message parser for parsing the sleep message; (c) a central-processing unit (CPU) for executing an ONU sleep mode based on the sleep message; (d) a media access control (MAC) for buffering data traffic during a sleep period designated in the sleep message; (e) an activity sensor for monitoring external system activity; and (f) a traffic detector for classifying the data traffic into at least one service category.

Preferably, the sleep-message parser is configured to extract at least one internal parameter.

Preferably, the CPU is configured to measure the sleep period.

Preferably, the MAC is configured to synchronize line framing of the data traffic.

Preferably, the ONU further includes: (g) a sequencing timer for measuring the sleep period.

According to the present invention, there is provided for the first time an optical-line terminal (OLT) for reducing power consumption in a PON while maintaining service continuity, the optical-network terminal including: (a) an ONU selector for determining ONU destinations for data traffic; (b) a multiplexer for selecting either the active data traffic or the sleep data traffic contingent upon whether the ONU is in an active mode or a sleep mode; and (c) a media access control (MAC) for transmitting the data traffic, received from the multiplexer, to at least one ONU.

Preferably, each ONU has a dedicated buffer, wherein the dedicated buffer serves as both the active-queue buffer and the sleep-queue buffer for each ONU.

Preferably, the multiplexer is operative to transmit the data traffic to the MAC without causing packet reordering.

Preferably, the MAC is configured to wake up at least one ONU without the is ONU being re-registered.

Preferably, the OLT further includes: (d) an active-queue buffer for buffering active data traffic while the ONU is in the active mode; and (e) a sleep-queue buffer for buffering sleep data traffic while the ONU is in the sleep mode.

Most preferably, the active-queue buffer and the sleep-queue buffer are implemented in hardware.

Most preferably, the active-queue buffer and the sleep-queue buffer are implemented in program code operative to be executed in a CPU of the ONU.

According to the present invention, there is provided for the first time a method for reducing power consumption in a PON while maintaining service continuity, the method including the steps of: (a) providing an OLT operationally connected to at least one ONU; (b) triggering a sleep request for at least one requesting ONU; (c) upon receiving a sleep acknowledgement, activating a sleep mode for at least one requesting ONU according to a sleep period designated in the sleep request; and (d) terminating the sleep mode according to the sleep period.

Preferably, the step of triggering is performed by the requesting ONU.

Preferably, the sleep acknowledgement is transmitted from the OLT to the requesting ONU.

Preferably, the sleep period is executed by a sleep command in the sleep acknowledgement.

Preferably, the sleep request and the sleep acknowledgement have a format selected from the group consisting of: a PLOAM format, an Ethernet-packet format, and a vendor-specific format.

Preferably, the sleep request and the sleep acknowledgement are transmitted repeatedly until the sleep request and the sleep acknowledgement are received.

Preferably, the sleep period is synchronized for all of the requesting ONUs.

Preferably, the step of terminating is triggered by a wake-up request from a sleeping ONU.

Preferably, the step of terminating is triggered upon a sleeping ONU receiving a wake-up acknowledgement from the OLT in response to a wake-up request from the sleeping ONU.

Preferably, the step of terminating is triggered based on a value of an activity counter.

Preferably, the method further includes the step of: (e) upon completion of the sleep period, transmitting buffered data traffic from the OLT to a sleeping ONU.

Preferably, the step of transmitting is performed without the sleeping ONU being re-registered.

Preferably, the step of transmitting is performed without causing packet reordering.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods and devices for reducing power consumption in a PON while maintaining service continuity. The principles and operation for reducing power consumption in a PON while maintaining service continuity, according to the present invention, may be better understood with reference to the accompanying description and the drawings.

Figure 1:
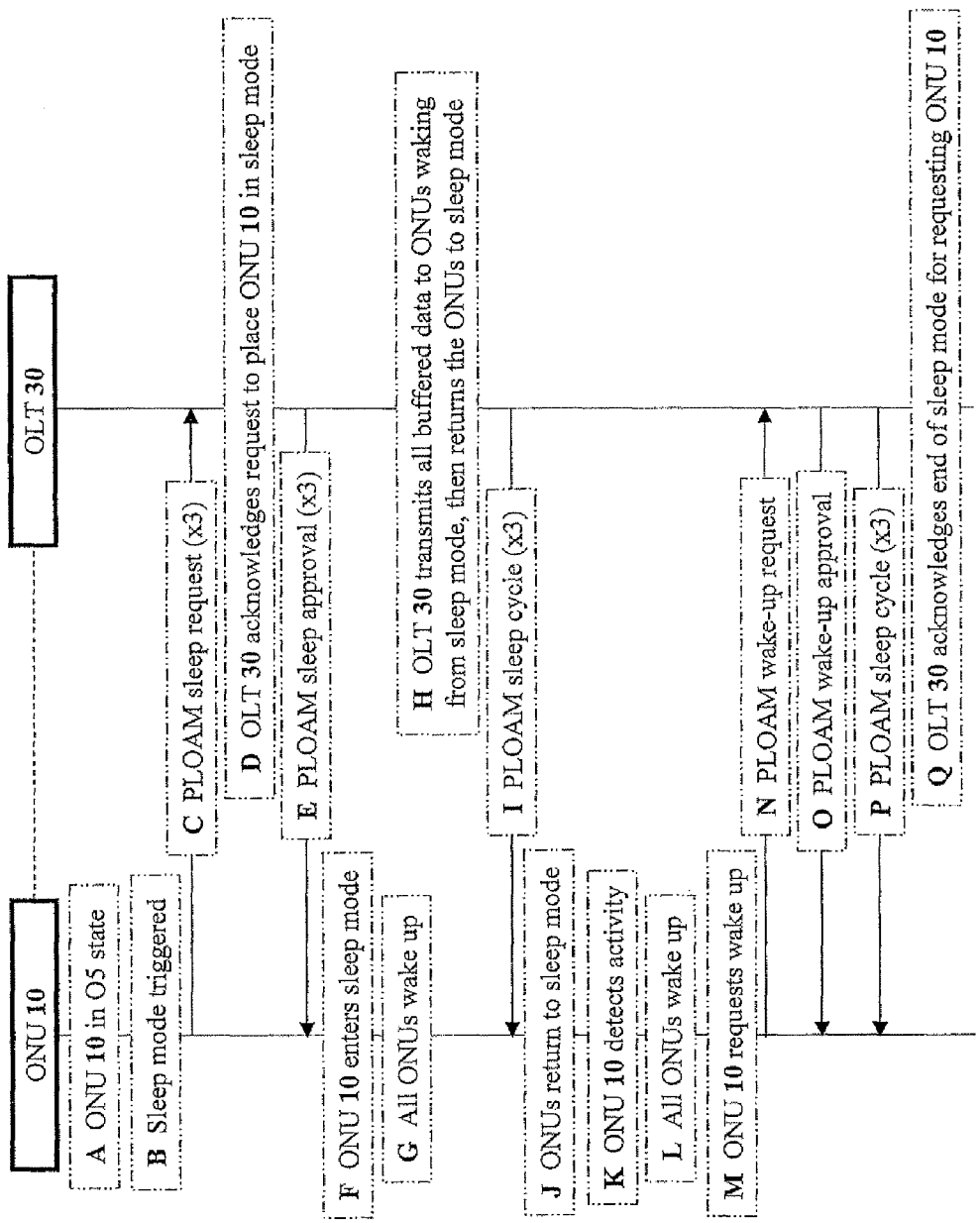
FIG. 1 is a simplified block diagram of the operational scheme for the implementation of GPON power-save negotiation sequences, according to preferred embodiments of the present invention.

Referring now to the drawings, FIG. 1 is a simplified block diagram of the operational scheme for the implementation of GPON power-save negotiation sequences, according to preferred embodiments of the present invention. An ONU 10 is shown operationally connected to an OLT 30.

The scheme starts with ONU 10 in O5 state (Block A). Sleep mode is triggered by an ONU request (Block B). ONU 10 transmits a sequence of three PLOAM sleep-mode request messages (where PLOAM refers to Physical Layer Operations, Administration and Maintenance as defined by the IEEE) (Block C). OLT 30 acknowledges the request to place ONU 10 in sleep mode (Block D), and responds by sending three PLOAM acknowledgement messages (Block E). The acknowledgement messages are "unicast" (i.e. only sent to the requesting ONU) contain the sleep end-time. ONU 10 can immediately enter sleep mode upon acknowledgement reception (Block F).

ONU 10 cannot initiate another sequence of PLOAM transmissions before a certain period of time has passed since a previous transmission. Once ONU 10 has transmitted the sleep request, the process cannot be aborted. The process must reach completion, even if the sleep trigger is no longer valid, and ONU 10 should be active. ONU 10 transmits the sleep request until acknowledged, and must wait until the end of the sleep period before asking to wake up.

Subsequent sleep modes can be triggered by OLT 30 by sending "broadcast" sleep PLOAM messages (i.e. to all ONUs) (Block I). OLT 30 sends such broadcast sleep messages after all sleeping ONUs have woken up (Block G), have received all buffered traffic (Block H), and no pending PLOAM messages exist. Such broadcast sleep messages return all ONUs to sleep mode (Block J).

If ONU 10 detects activity (Block K), ONU 10 can request to wake up (i.e. terminate sleep mode) (Block M) by sending a wake-up request PLOAM message three times (Block N) to OLT 30. OLT 30 receives a wake-up request, and sends three acknowledgement PLOAM messages (Block O) to ONU 10. Meanwhile, other ONUs may be waking up from sleep mode (Block L). OLT 30 acknowledges end of sleep mode for requesting ONU 10 (Block Q). ONU 10 exits sleep mode even if acknowledgment is not received, but ONU 10 keeps transmitting the PLOAM sequence until acknowledgment is finally received. Meanwhile, OLT can send "broadcast" sleep PLOAM messages to other ONUs (Block P). For GPON, all time events are referenced to the SuperFrame counter; for EPON, the PON_clock is used instead.

The negotiation sequence was designed to minimize the faults in an event of message loss. Without OLT acknowledgment, a lost message from ONU 10 will result in a situation of a sleeping ONU 10 and an unaware OLT 30. ONU 10 will "disappear" from the perspective of OLT 30. This is a catastrophic scenario, crippling service continuity from data- and network-management aspects. In such a scenario, Performance monitoring will not be able to identify the problem. When an acknowledgement message is used, there are two failure scenarios:

(1) a message is lost from ONU 10 to OLT 30 which results in both sides remaining active, causing power not to be saved as requested; and
(2) a message is lost from OLT 30 to ONU 10 which results in OLT 30 assumes ONU 10 is sleeping, while in fact ONU 10 is awake, causing power not to be saved at ONU 10 as requested.

Fiber-disconnect or OLT failure may occur during an ONU sleep period. In order to detect such an event, a "timebase-continuity" method is employed. Both EPON and GPON use a running counter for maintaining a single timebase between ONU 10 and OLT 30. If a major shift is detected in the timebase upon wake-up, it is assumed that a fault has occurred, and ONU 10 should not transmit without re-registration. OLT 30 may optionally ask ONU 10 to deactivate sleep mode by sending an OLT acknowledgement with sleep-end parameter.

In GPON, in particular, a threshold is defined between the SuperFrame value of the state-machine transition-time-to-sync state to the expected SuperFrame value. For example, if the difference is more than $M_3$ GPON-transmission-convergence (GTC) frames apart (where $M_3$ is a parameter similar to $M_1$ and $M_2$ defined in the GPON specification), then ONU 10 should leave O5 state to "popup" state (O6) since network timing parameters were lost. A preferred value for $M_3$ is 16.

In GPON, control and data traffic are separated. Two channels are dedicated for management: management-and-control interface (OMCI) and PLOAM. The buffering at each OLT 30 is extended to include the control messages, as well as the data buffering described above. If a broadcast PLOAM message sent during a sleep period is of interest to sleeping ONU 10, such as broadcast PLOAM messages not involving activation, OLT 30 retransmits the message, either as broadcast or unicast, after ONU 10 wakes up.

In the negotiation sequence described above, three messages are used. The first message is a sleep-mode request, from ONU 10 to OLT 30, which is transmitted three times. The second message is a sleep-mode acknowledgement, from OLT 30 to ONU 10, which is transmitted three times. OLT 30 relays the state of ONU 10 according to OLT acknowledgement. OLT 30 has the ability to instruct ONU 10 to enter sleep mode upon reception of the acknowledgement message (which specifies the sleep end-time).

The third message is a sleep command from OLT 30 to ONU 10, which is transmitted three times. The command contains the sleep end-time. The message can be unicast, in case only a single ONU needs to enter sleep mode. In preferred embodiments of the present invention, the message is broadcast. All ONUs receiving a sleep command while in sleep mode, fall asleep immediately.

While GPON uses PLOAM messages, UPON uses standard Ethernet packets. The parameters for both (i.e. PLOAM messages and EPON packets) are identical, except for differences resulting from different timebases and ONU numbering schemes.

Other embodiments of the negotiation sequence can be implemented as well. For example, ONU 10 can be allowed to interrupt a sleep period by sending a sleep-cancellation message. In such an embodiment, OLT 30 needs to periodically "poll" ONU 10, even though ONU 10 is expected to be asleep.

OLT 30 may interrupt a sleep period based on activity counters. OLT 30 can read the activity counters of all downstream traffic toward ONU 10. If the activity counters are higher than a pre-determined value, OLT 30 sends a sleep-end message to ONU 10.

Sleep-request triggers depend on system activity (or inactivity). Activity is determined by one or more of the following methods.
(1) Traffic flowing through ONU 10 is metered. ONU 10 can ignore selected traffic flows based on internal conditions. For example, during a power outage, ONU 10 can limit metering only to critical services that should be served during a power outage.

(2) Upper-layer control messages, indicating initiation and termination of traffic, are monitored. For example, session-initiation-protocol (SIP) control messages indicating "call starts" can cause ONU 10 to declare activity even before traffic is detected.

(3) External indications of system activity (e.g. phone-hook state-change arriving from a SLIC/SLAC (Subscriber-Line Interface Controller/Subscriber-Line Access Controller)) are probed.

In preferred embodiments of the present invention, fast locking of the frame pattern is implemented. The recovery time after turning on an ONU receiver needs to be minimized to improve the overall period in which ONU 10 is powered on. Furthermore, a guarantee that ONU 10 has completed all required synchronizations within the expected time is a requirement. In preferred embodiments of the present invention, a parallel state machine is implemented for locking in the frame pattern in order to avoid delays in the locking process resulting from random false-pattern detection. It should be noted that fast locking is not mandatory for power-save support. Non-supporting device can power the device longer before the expected wake-up time.

For example, in GPON, the Psync state machine is serial, checking one pattern at a time. Performance of a parallel state machine, checking several sync events at a time, is not degraded as a result of a "false lock". Such a parallel state machine also provides a more-reliable upper limit for the longest lock time. This also provides better operation under situations with an anticipated non-zero bit error rate (BER). In the GPON standard, a single false pattern clears the state machine; whereas, the parallel state machine can return one state back, accelerating the lock time.

The power consumption of next-generation EPON and GPON will increase with the expected increased bandwidth rate, raising the need for low-power operation. Any such higher-rate PON would support methods described herein for backward compatibility. Power-save schemes, according to embodiments of the present invention, can be applied to any medium, both for point-to-point or shared access. Such methods are useful regardless of the transmission technology (e.g. fiber, copper, COAX or wireless).

An example for a shared-access medium is a home-area network (HAN). A HAN exhibits similar properties to a PON (with similar reasons to reduce power consumption). The HAN elects a device as a centralized entity (similar to the role of the OLT), controlling and synchronizing the sleep period of all other end-stations. Another example of a point-to-point medium is point-to-point Ethernet. Power-saving operation is a consideration in energy-efficient Ethernet (EEE), and similar concepts of operation as described herein would apply as well.

Figure 2:
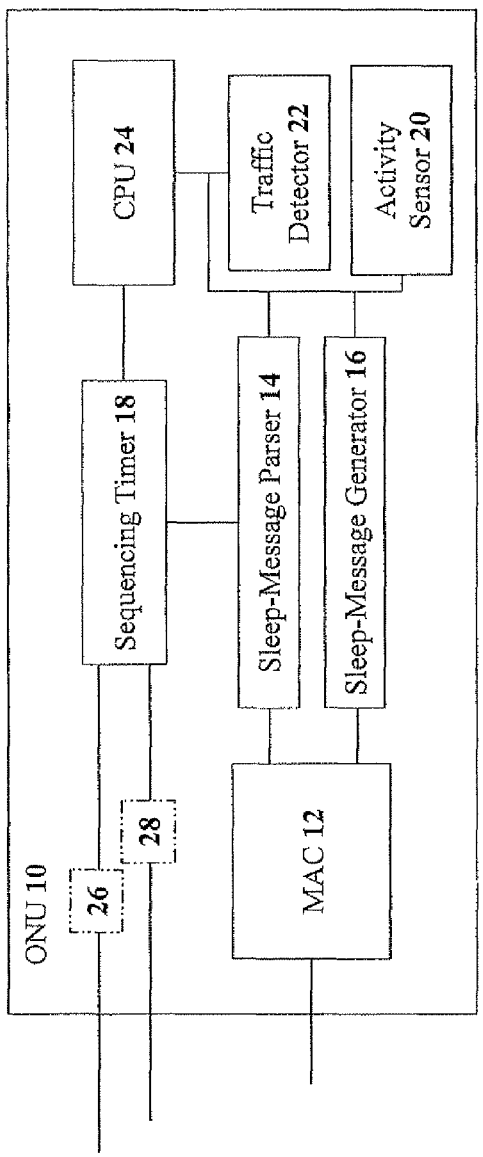
FIG. 2 is a simplified schematic block diagram of an exemplary ONU using a point-to-point implementation, according to preferred embodiments of the present invention.

FIG. 2 is a simplified schematic block diagram of an exemplary ONU using a point-to-point implementation, according to preferred embodiments of the present invention. ONU 10 is shown having a MAC 12 (ie. PON MAC), a sleep-message parser 14, a sleep-message generator 16, a sequencing timer 18, an activity sensor 20, a traffic detector 22, and a CPU 24. A PHY-control pin 26 allows for on/off control, and an internal-control pin 28 allows for internal-elements control (e.g. clock gating, power gating, and sleep-mode memory). Such an implementation can be applied to any point-to-point device or to a slave device in a shared access network.

Sleep-message parser 14 parses sleep-message content, and optionally can extract internal parameters. Message content is transferred to CPU 24. Sleep-message generator 16 generates sleep messages according to time controlled by CPU 24. Optionally, CPU 24 can generate the entire message.

Sequencing timer 18 measures the sleep time, and is responsible to set control pins 26 and 28. CPU 24 can be responsible for this activity as well, but with poorer accuracy, resulting in reduced power-savings.

Activity sensor 20 monitors external system activities (e.g. changes in phone-hook state). Traffic detector 22 classifies traffic into services, and activity of each service is metered. Traffic detector 22 monitors all the interfaces (not shown in FIG. 2) of ONU 10. CPU 24 determines whether ONU 10 can enter sleep mode, determines the appropriate sleep period. CPU 24 can be implemented using a dedicated hardware (HW) state machine or an off-the-shelf CPU core. Since ONU 10 is configured to minimize power consumption, any element that can be turned off to save power should have the ability to do so.

Figure 3:
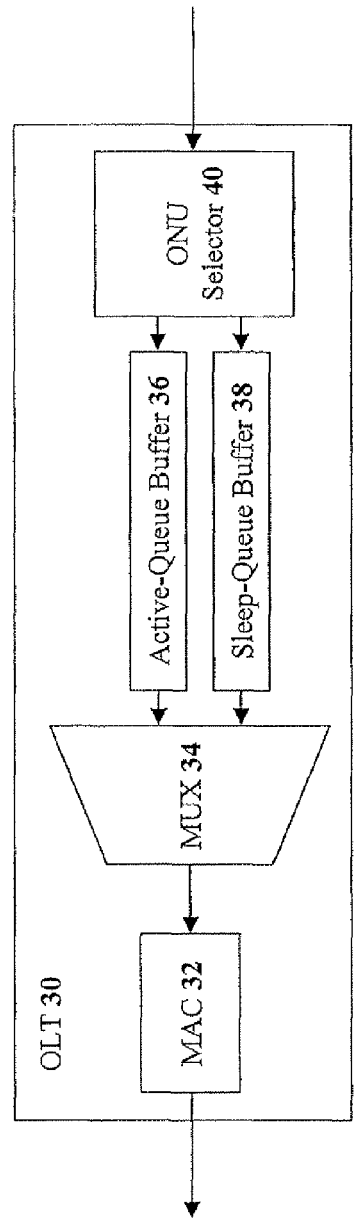
FIG. 3 is a simplified schematic block diagram of an exemplary OLT using a single sleep-queue implementation, according to preferred embodiments of the present invention.

FIG. 3 is a simplified schematic block diagram of an exemplary OLT using a single sleep-queue implementation, according to preferred embodiments of the present invention. OLT 30 is shown having a MAC 32 (i.e. PON MAC), a MUX 34 (i.e. multiplexer), an active-queue buffer 36, a sleep-queue buffer 38, and an ONU selector 40. At OLT 30, an important part of the power-saving approach is guaranteeing service continuity. There are two common implementation methods.

(1) A downstream buffer per user in which a dedicated buffer is allocated per ONU. Traffic to an ONU enters the associated buffer regardless of the ONU sleep state. Service continuity and traffic ordering is maintained by gating the traffic egress via a timer configured to the ONU sleep period.

(2) A common buffer serving all sleeping ONUs as shown in FIG. 3.

MAC 32, either GPON or EPON, is connected to the PHY layer (e.g. optical transceiver). MUX 34 selects traffic from active-queue buffer 36 or from sleep-queue buffer 38. Queue buffers 36 and 38 can implemented using a dedicated HW block, or implemented using software (SW) by CPU 24. The input to queue buffers 36 and 38 is determined by ONU selector 40 which decides the destination of each packet per ONU.

There are two operations required for guaranteeing transition between states without packet reordering.

(1) Transition from sleep mode to active mode (i.e. O5 or registered state)—This transition is performed for all ONUs at the end of a sleep period. All ONUs are awake, and can accept packets. All traffic is directed to active-queue buffer 36 by configuring ONU selector 40. Packets in sleep-queue buffer 38 are scheduled for transmission by MUX 34 before packets in active-queue buffer 36, preventing packet reordering. Since sleep-queue buffer 38 is not used when ONU 10 is awake, sleep-queue buffer 38 becomes empty first. Then, packets for transmission are taken from active-queue buffer 36.

(2) Transition from active mode to sleep mode—This transition is performed after OLT 30 sends a sleep command to ONU 10. A single ONU or a group of ONUs can transition concurrently. Traffic of a transitioned ONU 10 is directed to sleep-queue buffer 38 by configuring ONU selector 40. Transmission from active-queue buffer 36 has priority over transmission from sleep-queue buffer 38, as controlled by MUX 34, guaranteeing traffic is emptied in correct order. The traffic of sleep-queue buffer 38 is blocked for transmission until the next activity cycle, and transitioning ONU 10 will not receive any additional traffic after emptying active-queue buffer 36.

Since ONUs in sleep mode are a fixed group, with few ONUs occasionally changing states under normal operation, MUX 34 has the ability to restore a group ONU configuration.

It should be noted that the emptying time of queue buffers 36 and 38 needs be taken into account in certain transition cases. For example, a heavily-loaded active-queue buffer 36 may not empty in time to meet a set sleep start-time.

Figure 4:
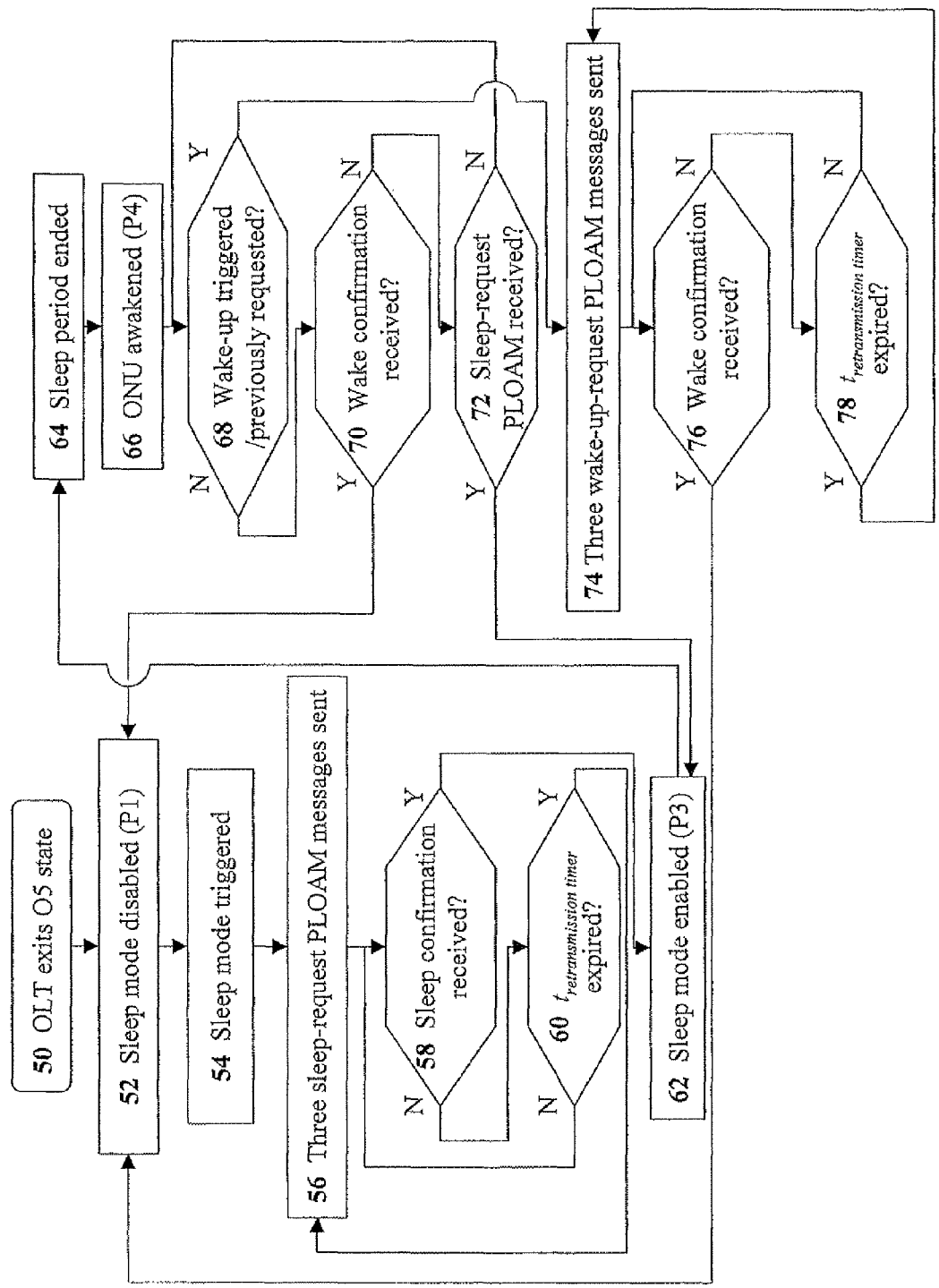
FIG. 4 is a simplified flowchart of the process steps in an ONJ state machine, according to preferred embodiments of the present invention.

FIG. 4 is a simplified flowchart of the process steps in an ONU state machine, according to preferred embodiments of the present invention. The process starts with the ONU exiting the O5 state (Step 50). The sleep mode (i.e. power-save mode (P1)) is currently disabled (Step 52). When sleep mode is triggered (Step 54), the sleep mode is requested by sending three sleep-request PLOAM messages (Step 56).

It is then determined whether a sleep confirmation has been received (Step 58). If a sleep confirmation has not been received, then the time, $t_{retransmission\ timer}$, is checked to determine if the time has expired (Step 60). If $t_{retransmission\ timer}$ has expired, then the process returns to Step 56. If $t_{retransmission\ timer}$ has not expired, then the process returns to Step 58. Once the sleep confirmation has been received in Step 58, then sleep mode is enabled (Step 62).

When the sleep period has ended (Step 64), the ONU is temporarily awakened (P4) (Step 66). It is then determined whether a wake-up has been triggered or previously requested (Step 68). If no wake-up has been triggered or previously requested, it is then determined whether a wake confirmation, indicating the end of the sleep period, has been received (Step 70). If a wake confirmation has been received, then the process continues with Step 52. If a wake confirmation has not been received, then it is determined whether a sleep-request PLOAM message has been received (Step 72). If no sleep-request PLOAM message has been received, then the process returns to Step 68. If a sleep-request PLOAM message has been received, then sleep mode is re-enabled (Step 62). If a wake-up has been triggered or previously requested in Step 68, wake-up is requested (P5) by sending three wake-up-request PLOAM messages (Step 74).

It is then determined whether a wake confirmation has been received (Step 76). If a wake confirmation has not been received, then the time, $t_{retransmission\ timer}$, is checked to determine if the time has expired (Step 78). If $t_{retransmission\ timer}$ has expired, then the process returns to Step 74. If $t_{retransmission\ timer}$ has not expired, then the process returns to Step 76. Once the wake confirmation has been received in Step 76, then sleep mode is disabled (Step 52).

Figure 5:
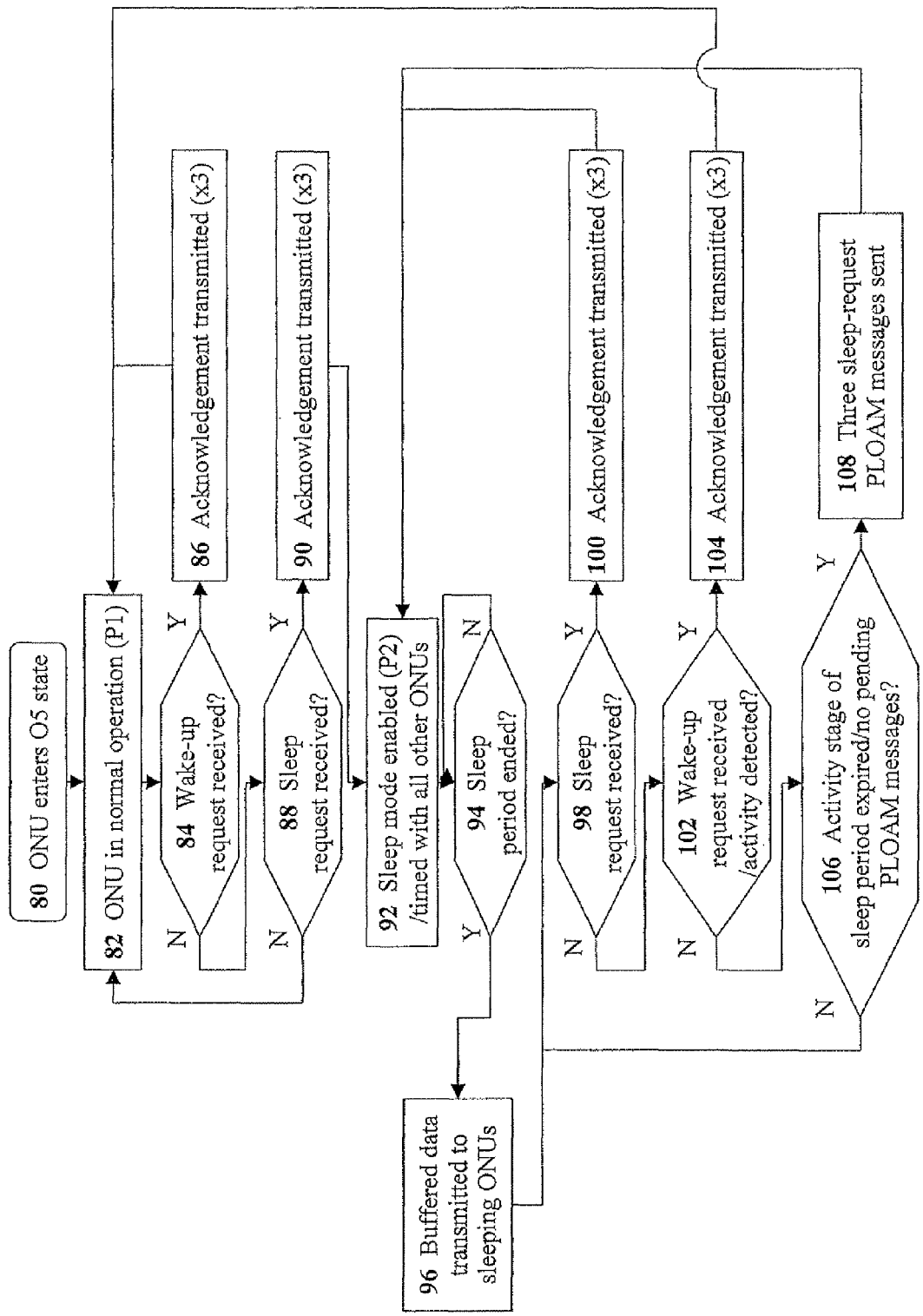
FIG. 5 is a simplified flowchart of the process steps in an OLT state machine, according to preferred embodiments of the present invention.

FIG. 5 is a simplified flowchart of the process steps in an OLT state machine, according to preferred embodiments of the present invention. The process starts with the ONU entering the O5 state (Step 80). The ONU is currently in normal operation (P1) (Step 82). It is then determined whether a wake-up request has been received (Step 84). If a wake-up request has been received, then a wake-up acknowledgement is transmitted three times (Step 86), and the process returns to Step 82. If no wake-up request has been received in Step 84, it is then determined whether a sleep request has been received (Step 88). If no sleep request has been received, then the process returns to Step 82. If a sleep request has been received, a sleep acknowledgement is transmitted three times (Step 90). Sleep mode is then enabled (P2), and timed with all other ONUs (Step 92).

It is then determined whether the sleep period has ended (Step 94). If so, then the buffered data is transmitted to the sleeping ONUs (Step 96). If not, the process returns to Step 94 until the sleep period ends. It is then determined whether a sleep request has been received (Step 98). If a sleep request has been received, then a sleep acknowledgement is transmitted three times (Step 100), and the process returns to Step 92.

If no sleep request has been received in Step 98, it is then determined whether a wake-up request has been received, or activity counters indicate that the sleeping ONU should wake up (Step 102). If a wake-up request has been received or threshold activity is detected, then a wake-up acknowledgement is transmitted three times (Step 104), and the process returns to Step 82. If no wake-up request has been received, and threshold activity is not detected in Step 102, it is determined whether the activity of the sleep period has expired, and if there are no pending PLOAM messages (Step 106). The activity stage of the sleep period is a "refresh cycle" built into the sleep mode in which, after being asleep for a period of time (e.g. 100-1,000 ms), the ONU wakes up briefly (e.g. 1-5 ms) to receive data. If the activity stage has expired, and there are no pending PLOAM messages, then three sleep-request PLOAM messages are sent (Step 108), and sleep mode is re-enabled (Step 92). If either condition is not met in Step 106, then the process returns to Step 98.

While the invention has been described with respect to a limited number of embodiments, it will be appreciated that many variations, modifications, and other applications of the invention may be made.

What is claimed is:

1. An optical-network unit (ONU) for reducing power consumption in a passive optical network (PON) while maintaining service continuity, the optical-network unit comprising:
   (a) a sleep-message generator for generating a sleep message;
   (b) a sleep-message parser for parsing said sleep message;
   (c) a central-processing unit (CPU) for executing an ONU sleep mode based on said sleep message;
   (d) a media access control (MAC) for buffering data traffic during a sleep period designated in said sleep message;
   (e) an activity sensor for monitoring external system activity; and
   (f) a traffic detector for classifying said data traffic into at least one service category.

2. The optical-network unit of claim 1, wherein said sleep-message parser is configured to extract at least one internal parameter.

3. The optical-network unit of claim 1, wherein said CPU is configured to measure said sleep period.

4. The optical-network unit of claim 1, wherein said MAC is configured to synchronize line framing of said data traffic.

5. The optical-network unit of claim 1, the ONU further comprising:
   (g) a sequencing timer for measuring said sleep period.

6. An optical-line terminal (OLT) for reducing power consumption in a PON while maintaining service continuity, the optical-line terminal comprising:
   (a) an ONU selector for determining ONU destinations for data traffic;
   (b) a multiplexer for selecting either active data traffic or sleep data traffic contingent upon whether the ONU is in an active mode or a sleep mode respectively; and
   (c) a media access control (MAC) for transmitting said data traffic, received from said multiplexer, to at least one ONU.

7. The optical-line terminal of claim 6, wherein each said ONU has a dedicated buffer, wherein said dedicated buffer serves as both an active-queue buffer and a sleep-queue buffer for said each ONU.

8. The optical-line terminal of claim 6, wherein said multiplexer is operative to transmit said data traffic to said MAC without causing packet reordering.

9. The optical-line terminal of claim 6, wherein said MAC is configured to wake up said at least one ONU without said at least one ONU being re-registered.

10. The optical-line terminal of claim 6, the optical-line terminal further comprising:
(d) an active-queue buffer for buffering active data traffic while the ONU is in said active mode; and
(e) a sleep-queue buffer for buffering sleep data traffic while the ONU is in said sleep mode.

11. The optical-line terminal of claim 10, wherein said active-queue buffer and said sleep-queue buffer are implemented in hardware.

12. The optical-line terminal of claim 10, further including a central processing unit (CPU), wherein said CPU is configured red to implement said active-queue buffer and said sleep-queue buffer.

13. A method for reducing power consumption in a PON while maintaining service continuity, the method comprising the steps of:
(a) providing an OLT operationally connected to at least one ONU;
(b) triggering a sleep request for at least one requesting ONU of said at least one ONU;
(c) upon receiving a sleep acknowledgement, activating a sleep mode for said at least one requesting ONU according to a sleep period designated in said sleep request; and
(d) terminating said sleep mode according to said sleep period.

14. The method of claim 13, wherein said step of triggering is performed by said at least one requesting ONU.

15. The method of claim 13, wherein said sleep acknowledgement is transmitted from said OLT to said at least one requesting ONU.

16. The method of claim 13, wherein said sleep period is executed by a sleep command in said sleep acknowledgement.

17. The method of claim 13, wherein said sleep request and said sleep acknowledgement have a format selected from the group consisting of a PLOAM format, an Ethernet-packet format, and a vendor-specific format.

18. The method of claim 13, wherein said sleep request and said sleep acknowledgement are transmitted repeatedly until said sleep request and said sleep acknowledgement are received.

19. The method of claim 13, wherein said sleep period is synchronized for all of said at least one requesting ONU.

20. The method of claim 13, wherein said step of terminating is triggered by a wake-up request from a sleeping ONU.

21. The method of claim 13, wherein said step of terminating is triggered upon a sleeping ONU receiving a wake-up acknowledgement from said OLT in response to a wake-up request from said sleeping ONU.

22. The method of claim 13, wherein said step of terminating is triggered based on a value of an activity counter.

23. The method of claim 13, the method further comprising the step of
(e) upon completion of said sleep period, transmitting buffered data traffic from said OLT to a sleeping ONU.

24. The method of claim 23, wherein said step of transmitting is performed without said sleeping ONU being re-registered.

25. The method of claim 23, wherein said step of transmitting is performed without causing packet reordering.

26. A method for reducing power consumption in a PON while maintaining service continuity, the method comprising the steps of:
(a) providing an OLT operationally connected to at least one ONU;
(b) triggering a sleep request for at least one requesting ONU of said at least one ONU;
(c) upon receiving a sleep acknowledgement, activating a sleep mode for said at least one requesting ONU according to a sleep period designated in said sleep request;
(d) during said sleep period buffering data for said at least one requesting ONU;
(e) terminating said sleep mode according to said sleep period; and
(f) transmitting the buffered data to said at least one requesting ONU.

* * * * *

UNITED STATES PATENT AND TRADEMARK OFFICE
CERTIFICATE OF CORRECTION

| | | |
|---|---|---|
| PATENT NO. | : 8,000,602 B2 | Page 1 of 1 |
| APPLICATION NO. | : 12/104615 | |
| DATED | : August 16, 2011 | |
| INVENTOR(S) | : Onn Haran et al. | |

It is certified that error appears in the above-identified patent and that said Letters Patent is hereby corrected as shown below:

Column 10, claim 1:

Line 29 should be corrected as follows:
change

--(e)-- to

"(c)"

Column 11, claim 12:

Line 12 should be corrected as follows:
Change:

--configured red to implement...-- to

"configured to implement..."

Signed and Sealed this
Twenty-seventh Day of September, 2011

David J. Kappos
*Director of the United States Patent and Trademark Office*